Figure 1:
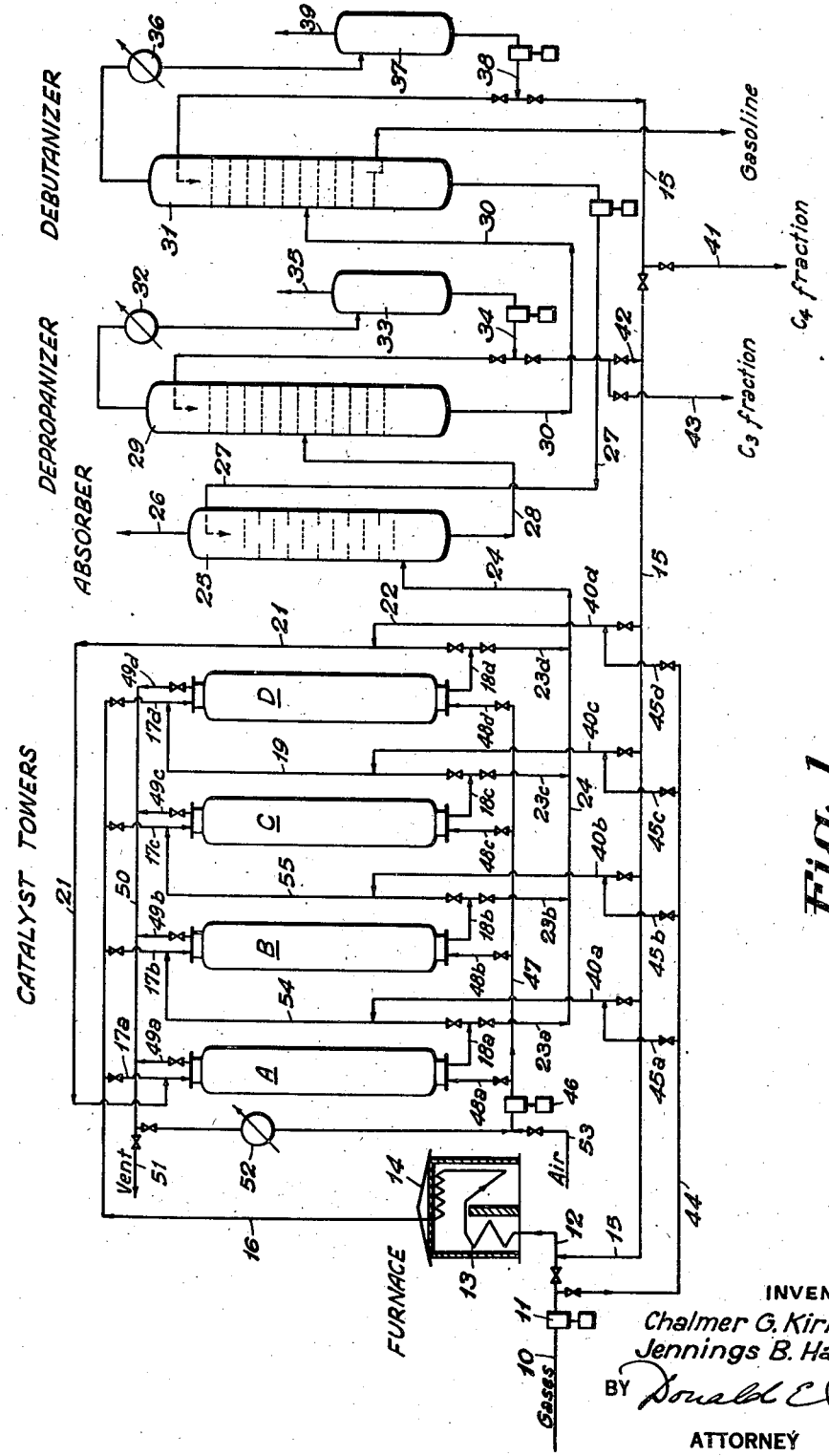

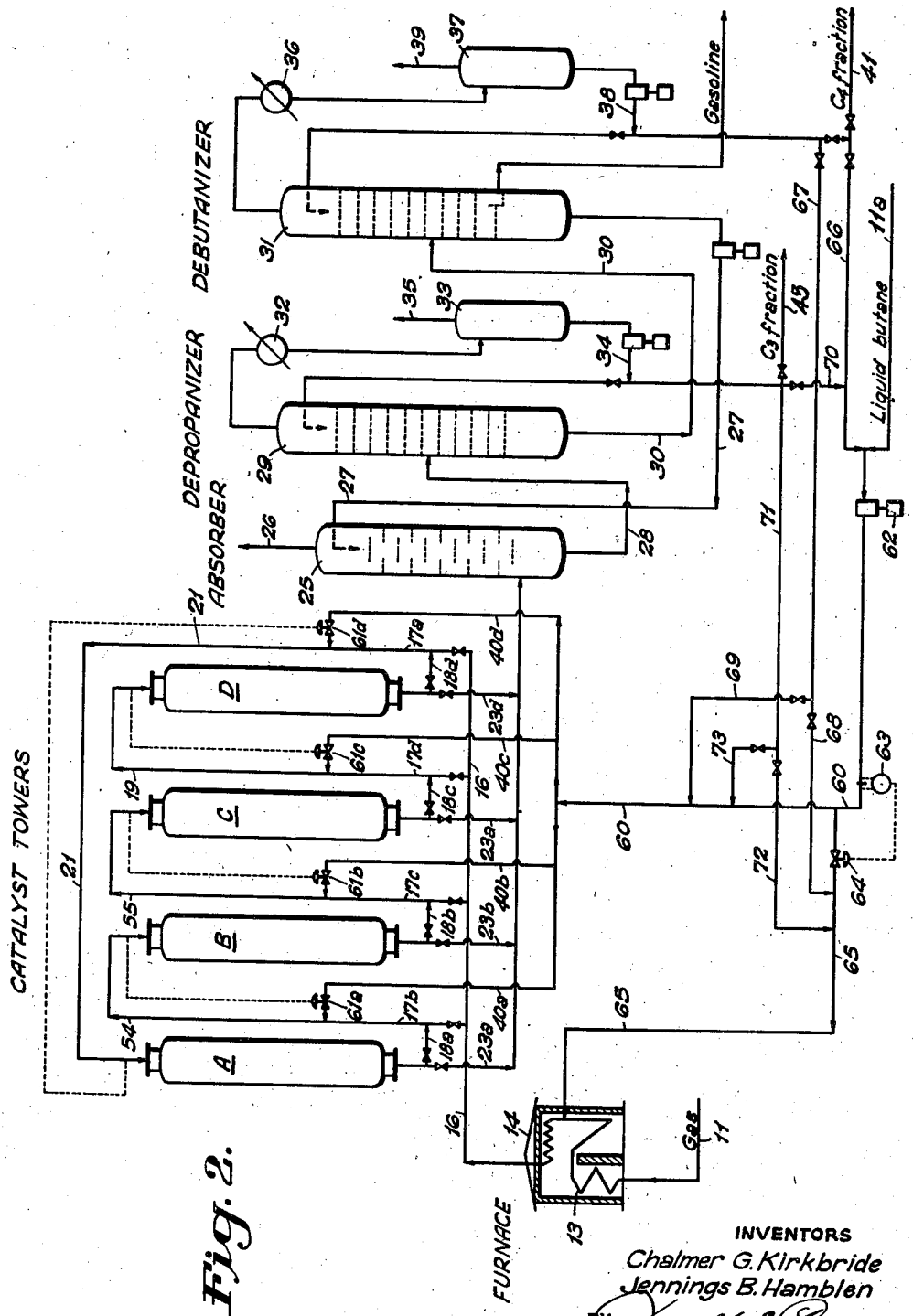

Patented Feb. 18, 1947

2,415,951

UNITED STATES PATENT OFFICE 2,415,951

CATALYST BED TEMPERATURE CONTROL

Chalmer G. Kirkbride, Galveston, and Jennings B. Hamblen, Texas City, Tex., assignors to Pan American Refining Corporation, New York, N. Y., a corporation of Delaware Application May 5, 1939, Serial No. 271,900

1 Claim. (Cl. 260—683.15)

This invention relates to polymerization of hydrocarbon gases and it pertains more particularly to the catalytic polymerization of $C_3$ and $C_4$ olefins for the production of high quality motor fuel.

An object of the invention is to provide a commercially successful multi-stage, countercurrent catalytic polymerization system wherein hydrocarbon gases containing propylene and butylenes are passed under a pressure of about 200 to 400 pounds per square inch through catalyst beds comprising phosphoric acid deposited on kieselguhr at temperatures of about 350° to 480° F. A further object is to prevent catalyst softening and degradation and to extend the life of the catalyst, i. e. to prevent undue fouling in the catalyst bed and to prevent catalyst disintegration and loss of activity. A further object is to prevent undue variations in operating temperatures and pressures and to obtain uniform polymerization activity in each particular portion of the catalyst beds. A further object is to obtain increased utilization of olefins, increased yields of gasoline and decreased quantities of coke and heavy polymers. A further object is to increase the on-stream periods and to reduce shut-down periods for revivification.

When operating catalyst chambers in series it has been commercial practice to introduce the fresh feed gases into a tower containing fresh or revivified catalyst because it was found that if gas containing polymer vapors were introduced into a fresh tower these vapors would be over-polymerized and thus cause the formation of coke and undesirable high molecular weight polymers in said tower. An object of this invention is to provide a method and means whereby the gaseous charging stock may be first passed through partially spent catalyst chambers and then introduced into fresh chambers without over-polymerization and fouling in the fresh catalyst.

A further object of the invention is to control and limit the temperature spread in the reaction chambers and to minimize the deviation from optimum equilibrium conditions in said chamber. The catalyst has an optimum equilibrium moisture content which is a function of temperature. With wide-spread temperature conditions in the tower, this optimum equilibrium prevails at only one point or zone in the tower. If it is near the bottom, the upper part will pick up moisture and result in an increase in pressure drop. If it is near the top, the lower part of the tower will be dried out, resulting in loss of activity. By minimizing the temperature spread, we minimize the problem of "transient pressure drop" which is a result of excessive moisture in the process gases which softens the catalyst and results in an increase in resistance to flow at that point.

The maximum desirable temperature is about 480° F., but temperatures as high as 500° to 600° F. have been encountered in actual practice, even where every effort was being made to control this temperature. An object of the invention is to provide methods and means for close temperature control in catalytic polymerization reactions without resorting to the expensive, troublesome and inefficient expedients of introducing heat exchange coils throughout the catalyst bed.

The refinery gases charged to the catalytic polymerization plant may vary in olefin content from time to time. This in turn tends to upset the equilibrium conditions in the catalyst beds. An object of our invention is to provide methods and means for handling stocks of widely varying olefin content without upsetting such equilibrium conditions. A further object is to obtain a greater olefin utilization than has heretofore been possible. Other objects will be apparent as the following detailed description of the invention proceeds.

We have discovered that the above objects may be accomplished in a large degree by the use of two or three simple expedients: (1) operating a plurality of catalyst zones in series, with the most active zone last in the series (contrary to prior practice and recommendations); (2) introducing a predetermined amount of light hydrocarbon liquid such as $C_4$ or $C_3$–$C_4$ hydrocarbons into the stream which leaves one zone before that stream enters the following zone; and (3) regulating the olefin content of the liquefied hydrocarbons so introduced (as well as the olefin content of the hydrocarbons introduced into the first zone). Expedient (1) above is generically called in this specification and in the appended claims "countercurrent catalytic polymerization."

There are two general sources of feed to the catalyst containing predominantly $C_4$ or $C_3$–$C_4$ olefins: (1) from the cracking system for example, the debutanizer, stabilizer and primary gas separator (these gases usually contain a relatively large amount of olefins, ranging from 8% for primary gas to 40% for $C_4$ from the debutanizers); and (2) from the polymerization system itself, for example the debutanizer or depropanizer (these streams from these sources usually contain much smaller amounts of olefins, usually about 10% to 20%). By blending different amounts of $C_4$ from the cracking system debutanizers, $C_4$ from the polymerization system debutanizer and reflux from the polymerization system depropanizer we can obtain a liquefied $C_4$ or $C_3$–$C_4$ blend which contains any desired olefin content from about 10% to 40%, respectively. In practicing our invention we employ blends of $C_4$ from the cracking system debutanizers and reflux from the polymerization system depropanizer for introduction immediately after each catalyst zone in the series. By use of this simple but novel expedient we have been able to obtain uniform temperature and pressure conditions at each point throughout the entire series of zones, to obtain remarkably long runs, and to obtain maximum olefin conversion into high quality motor fuel.

Our invention will be described as applied to an existing commercial polymerization system employing four catalyst zones but it should be understood that in new installations it may be desirable to have more than four zones, and the zones may be of such size that considerably higher olefin concentrations may be used, particularly in the first stages of the process. The catalyst zones may be in separate towers or two or more zones may be employed in a single tower by providing spaces between the zones in said tower for the introduction of liquefied gases. As currently practiced in the four zone system, wherein three zones are onstream and one is undergoing regeneration, we have found that the charge to the least active zone may contain about 20 to 24% of olefins. This charge is introduced to said zone at about 360 to 400° F. and a pressure of about 250 to 300 pounds per square inch, and is preferably passed through the zone at such a rate as to give a time of contact of about 1 to 3 minutes, although longer or shorter contact times may be used. The rise in temperature is controlled by regulating the olefin content so that the exit temperature should preferably not exceed 480° F. The gases leaving the least active zone have a considerably lower olefin content than the fresh charge and they are too hot to be charged to the next zone; therefore we introduce liquefied $C_4$ or $C_3$–$C_4$ hydrocarbons in an amount sufficient to lower the temperature of the mixture such that the exit temperature for this zone does not exceed preferably 480° F. In this second zone, which is more active than the first zone, the rise in temperature is usually somewhat lower than in the first zone, the final temperature being less than 480° F. The contact time for this zone is preferably about 1 to 3 minutes although longer or shorter contact times may be employed. To the gases leaving the second zone we add additional liquefied $C_4$ or $C_3$–$C_4$ hydrocarbons in sufficient quantity to regulate the temperature entering the third zone so that the final temperature does not rise above about 480°. Preferred contact time in this zone is also 1 to 3 minutes although it can vary from this as pointed out in connection with zones 1 and 2. This process is repeated in the fourth zone when it is available for use. This gas mixture is then charged to the most active catalyst zone wherein the temperature rise is still lower. The final olefin content is thus reduced to about 5 or 6%.

It should be understood, of course, that we may use only two beds or we may use more than three beds in practicing the invention, and that the specific temperatures, pressures and olefin concentrations are not limited to those herein described but will be determined by each particular installation and each particular charging stock. It is essential that the olefin content be lower in each successive stage, that the temperature be regulated between successive stages, and that the $C_4$ or $C_3$–$C_4$ hydrocarbons introduced for this temperature regulation have the olefin content required to give not only the proper temperature condition but the proper olefin content for the gases entering the next stage.

The invention will be more clearly understood from the following detailed description and from the accompanying drawings which form a part of this specification and in which:

Figure 1 is a diagrammatic plan or flow diagram of one system for regulating countercurrent catalytic polymerization, and Figure 2 is an alternative flow diagram showing another embodiment of our invention.

In petroleum refining processes wherein hydrocarbons are thermally or catalytically converted into other hydrocarbons of different characteristics and molecular weights, a large amount of condensable hydrocarbon gases may be produced and these gases may contain substantial quantities of propylene and butylenes. For example, thermal or catalytic cracking systems produce appreciable quantities of gases from which the hydrogen, methane, ethane and ethylene are usually separated by an absorber system or primary gas separator. A $C_4$ or a $C_3$–$C_4$ fraction of cracked gas is usually obtained from a gas fractionation system or from a cracked gasoline stabilizer. The so-called stabilizer gas from a cracking system consists chiefly of $C_3$ or $C_4$–$C_3$ hydrocarbons. Debutanizer reflux consists chiefly of $C_4$ hydrocarbons and it contains large amounts of butylenes. Natural gases may be cracked to provide the $C_4$ or $C_3$–$C_4$ charging stock for the polymerization. We do not limit ourselves to any particular source of polymerization charging stock.

This invention relates particularly to a process for converting the $C_4$ or $C_3$–$C_4$ olefins in hydrocarbon fractions into high quality motor fuel by catalytic polymerization, and particularly by the use of a phosphoric acid catalyst prepared by supporting a phosphoric acid such as orthophosphoric acid on kieselguhr, fuller's earth or similar aluminum silicates or silicious materials. It should be understood, however, that the invention is applicable to other catalytic polymerization processes and to other catalytic conversion systems wherein the same problems arise.

The $C_4$ or $C_3$–$C_4$ hydrocarbons from the cracking system, which contain olefins, are introduced through line 10 by pump 11 into the polymerization system to coils 13 of furnace 14. Debutanizer and/or depropanizer reflux from the polymerization system is introduced into line 12 by line 15. The olefin concentration of the mixture is about 19 to 28%, and the mixture is heated to a temperature about 380° to 420° F. at a pressure of about 310 pounds per square inch, under which conditions it is introduced to transfer line 16 and branch line 17c into catalyst chamber C which is about 8 feet in diameter, about 40 feet high, and which contains about 60,000 pounds of catalyst material. This tower contains the least active catalyst, it having been in operation for about fifty to sixty days. The temperature rise in this tower is about 50 to 95° F. The hot polymerized products and gases from the base of the tower are introduced by line 18c and 19 to the top of catalyst tower D which is similar to tower C except that it has only been onstream for a period of about 35 days. An amount of liquefied C₄ or C₃–C₄ hydrocarbons is introduced into line 19 by line 40c to bring the resulting temperature in line 19 down to about 390–410° F. and the amount of olefins in this introduced fraction may be so regulated as to bring the olefin content of the mixed stream to about 14% to 15%. The temperature rise may be about 45 to 55° F.

Products leaving the bottom of tower D are introduced by line 18d into line 21 wherein it is admixed with liquefied C₄ or C₃–C₄ hydrocarbons from line 22, the amount and olefin content of the added hydrocarbons being so proportioned as to give a resulting mixture in line 21 which has an olefin content of about 12% and a temperature of about 400° F. This mixture is then passed through fresh catalyst tower A wherein the temperature rise is only about 15 to 40° F. Products from tower A are passed by line 18a into line 23a and line 24 to absorber 25, from which hydrogen, methane and C₂, and perhaps C₃ hydrocarbons are vented through line 26. Absorber oil introduced through line 27 picks up the C₄, and some C₃ hydrocarbons, together with heavier hydrocarbons, and this absorber oil mixture is introduced by line 28 to depropanizer 29. Gasoline, together with C₄ hydrocarbons and hydrocarbons heavier than gasoline are withdrawn through line 30 to debutanizer 31.

Overhead from depropanizer 29, chiefly C₃ hydrocarbons, passes to condenser 32 and is introduced into depropanizer reflux drum 33 from which the condensate is pumped thru line 34 to the top of the depropanizer as reflux and the non-condensibles are withdrawn through line 35.

Overhead from debutanizer 31, chiefly C₄ hydrocarbons, is condensed in cooler 36 and introduced into debutanizer reflux drum 37, from which a part is pumped to the top of the debutanizer column thru line 38. The debutanizer reflux drum 37 is also provided with vent 39.

Debutanizer reflux may be returned through line 15 to the charge entering the pipe still or through lines 40a, 40b, 40c or 40d for admixture with gases undergoing polymerization. Part or all of the net C₄ condensate may, however, be withdrawn thru line 41. Similarly, part of the depropanizer overhead condensate may be introduced into line 15 by line 42 or withdrawn from the system through line 43.

As hereinabove pointed out, it is essential that the C₄ or C₃–C₄ hydrocarbons introduced through lines 40a, 40b, 40c, and 40d, and 22 have a predetermined and carefully controlled olefin content. The olefin content of gases in line 15 may be about 15 to 20% while the olefin content of liquid feed in line 10 may be as high as 30 or 40%. A portion of this feed is therefore passed by line 44 into lines 45a, 45b, 45c and 45d for admixture with debutanizer and/or stabilizer reflux from line 15 and branch lines 40a, 40b, 40c and 40d. In each instance the amount of liquefied gas in line 15 and the fresh feed from line 44 is controlled by the regulation of valves in lines 40a—b—c—d, and 45a—b—c—d, respectively, so that any desired concentration of olefins may be obtained in the liquefied gas mixture which is to be introduced into the gas stream leaving the bottom of one tower and introduced into the top of the next tower.

While towers C, D and A are onstream, as hereinabove described, tower B may be regenerated in the conventional manner by burning out the carbonaceous materials under carefully regulated temperature conditions with gases containing controlled quantities of oxygen. During regeneration the towers, of course, are cut out of the polymerization cycle and regeneration gases are introduced by pump 46, line 47, branch line 48b into tower B and withdrawn through line 49b, and line 50. A part of the regeneration gases may be vented through line 51 and the remainder cooled in cooler 52 and fortified with additional oxygen or air from line 53 before being recycled by pump 46. The regeneration may be either from top to bottom or bottom to top of each tower. The regeneration per se is well-known in the art and forms no part of the present invention, it will therefore not be described in further detail.

When the activity of tower C falls off to too great an extent the fresh feed will be introduced from line 16 and branch line 17d into tower D and fresh catalyst tower B will be cut in as the last tower of the series, while tower C is cut out for regeneration. When tower B is cut in the valve in line 23a will be closed and the gases from the bottom of tower A will be introduced by line 54 in admixture with added C₄ or C₃–C₄ hydrocarbons from lines 45a and 40a to the top of tower B. Similarly, when tower D is cut out and tower C forms the last tower in the series, the products from the base of tower B will be introduced through line 55 in admixture with added C₄ or C₃–C₄ hydrocarbons from lines 45b and 40b to the top of tower C.

The amount of liquefied gases added through lines 45a, b, c and d and lines 40a, b, c and d will be governed by the temperature of gases leaving towers A, B, C and D respectively, sufficient being added to obtain the desired temperature for the top of the next tower. A tower may start in last position with an inlet temperature of 420° F. The temperature of inlet is reduced as the tower is moved to the next position. Inlet temperature is usually 410° F. in third, 400° F. in second and 380° F. or 390° F. in first position, depending upon activity of the catalyst. The temperature spread can be gradually decreased as the gases proceed from the less active to the more active catalyst zones. Also the most highly olefinic gases can be introduced into the leading or most spent catalyst zone at a temperature of between about 380 and about 400° F. and the gases of decreased olefin content introduced into the trailing or less spent catalyst zone at a temperature of between about 400 and about 420° F.

Preferably the tower in last position (freshest catalyst) has an inlet temperature of about 420° F., and as the tower takes different positions its inlet temperature gradually decreases till when in first position it may be about 380° F. The composition of the added liquefied gases will depend on the composition of the gases leaving the previous tower and the condition of the following tower (i. e. fresh, partially spent, considerably spent, etc.). Thus in the above example, say about 10 to 40 barrels per hour of liquefied gas were introduced between towers and the gas consisted essentially of C₃–C₄ hydrocarbons from the cracking unit via 44 and 45a and b. If the olefin concentration of the products leaving the first tower is higher than that desired for the second tower, we may use nothing but debutanizer reflux and/or stabilizer reflux from line 15 for obtaining the desired cooling effect and olefin dilution. In any event, the temperature rise in each tower does not exceed about 90° F., the pressure drop in each tower remains more substantially constant, maximum yields of gasoline are obtained, and the catalyst life is materially extended.

From the above description it will be seen that we have in effect provided a successful means for solving the many problems which have heretofore made it impossible to obtain countercurrent polymerization in systems of this type. The unreacted olefins leaving the system have been reduced from 7% to 6%, the throughput and smoothness of operation have been markedly increased and the problems of temperature and pressure control have been substantially solved. In Fig. 2 we have shown a modified and somewhat simplified arrangement whereby many of the objects of our invention may be accomplished. In this embodiment of the invention gas from the cracking units is introduced through line 11 and liquid C4 hydrocarbons from the cracking units are introduced through line 11a. Lines 17a, 17b, 17c and 17d join lines 21, 54, 55, and 19 respectively, so that only one feed inlet is required for each tower. Instead of providing separate lines 15 and 44 as a source of gases of different olefin concentration we provide a single line 60, and we regulate the olefin concentration of hydrocarbons in this line as will be hereinafter described.

Temperature-controlled valves 61a, 61b, 61c and 61d automatically regulate the amount of liquid hydrocarbons introduced through lines 40a—b—c—d, respectively, in accordance with the temperature of the feed introduced into the following tower.

In this embodiment the liquid C4 fraction from the cracking units (which normally have the highest olefin concentration), is introduced through line 11a by pump 62 into line 60 and a constant pressure is maintained on line 60 by a pressure-controlled device 63 which automatically opens valve 64 when a predetermined pressure is exceeded, thereby permitting the hydrocarbons from line 60 to be introduced through line 65 to an intermediate point in pipe still 14.

C4 hydrocarbons from debutanizer reflux drum 37 may be withdrawn through line 41, passed through line 66 to line 11a, or passed by line 67 either through line 68 to line 65, or through line 69 to line 60. The condensate from depropanizer reflux drum 33 may be passed to storage through line 43, introduced through line 70 to lines 66 and 11a, or introduced through lines 71 and 72 to line 65, or through lines 71 and 73 to line 60. It will thus be seen that the olefin concentration in line 60 may be regulated at will and the depropanizer and debutanizer reflux from the polymerization system may be utilized to supply the necessary liquids for introduction between stages during the polymerization process.

While we have described preferred embodiments of our invention it should be understood that we do not limit ourselves to any of the specific operating conditions hereinabove set forth since it is obvious that the principles of our invention may be applicable to different operating conditions and different charging stocks by those skilled in the art.

We claim:

In a catalytic polymerization system employing a plurality of catalyst towers containing phosphoric acid mounted on an inert carrier and in which the material to be polymerized is passed first through a reaction tower of least catalytic activity and successively through towers containing catalysts of increasing activity, the method of regulating temperatures and pressures throughout the entire system, which comprises introducing a $C_3$-$C_4$ hydrocarbon gas fraction into a partially spent catalyst zone at a temperature of about 400° F. and a pressure of about 300 pounds, passing said mixture through said first catalyst zone to give a time of contact of about 1 to 3 minutes, whereby the temperature is increased by exothermic polymerization to about 450 to 500° F., withdrawing products and gases from the base of said catalyst zone and admixing therewith a sufficient amount of liquefied $C_3$-$C_4$ hydrocarbons to bring the temperature back to about 400° F. and to obtain a lower olefin concentration than that of the gases charged to the first tower, contacting said gases in the second catalyst tower for about 1 to 3 minutes, whereby the exothermic heat of polymerization raises the temperature to about 440 to 460° F., removing products from the base of said second tower and admixing therewith a liquefied $C_3$-$C_4$ hydrocarbon fraction in an amount sufficient to reduce the temperature of the mixture to about 400° F. and to give an olefin concentration lower than that of the gas charged to the second tower, contacting the mixture in the third tower for about 1 to 3 minutes, separating the products of conversion from the third tower into a plurality of fractions including a gasoline fraction, a $C_3$ fraction, and a $C_4$ fraction, and recycling to at least one of said towers a part of the $C_4$ fraction.

CHALMER G. KIRKBRIDE.
JENNINGS B. HAMBLEN.

REFERENCES CITED

The following references are of record in the file of this patent:

UNITED STATES PATENTS

| Number | Name | Date |
|---|---|---|
| 1,947,306 | Plummer | Feb. 13, 1934 |
| 2,040,658 | Kuentzel et al. | May 12, 1936 |
| 2,170,275 | Nelson | Aug. 22, 1939 |
| 2,176,354 | Nelson | Oct. 17, 1939 |
| 677,670 | Krauss | July 2, 1901 |
| 2,104,858 | Ferguson | Jan. 11, 1938 |
| 2,245,734 | Subkow | June 17, 1941 |
| 2,260,990 | Goldsby | Oct. 28, 1941 |
| 2,291,216 | Gerhold | July 28, 1942 |
| 2,102,073 | Ipatieff | Dec. 14, 1937 |
| 2,116,157 | Morrell | May 3, 1938 |

FOREIGN PATENTS

| Number | Country | Date |
|---|---|---|
| 451,788 | British | Aug. 12, 1936 |
| 467,853 | British | June 24, 1937 |
| 831,682 | French | June 13, 1938 |

OTHER REFERENCES

Refiner & Nat. Gasoline Manufacturer, vol. 17, Jan. 1938, pps. 15 to 20, pertinent pages 17 and 18. 196–10.

Shanley et al., National Petroleum News, May 31, 1939, pages R–234–R240. (Patent Office Library.)

Ipatieff and Egloff, "Polymer Gasoline from Cracked Gases," U. O. P. Bulletin No. 166 (1935), pages 5–22 (pages 6–8 pertinent). (Copy in Div. 31, 260–683.15.)